[54] TIME ANALOG CONVERTER CIRCUIT FOR JITTER-FREE OPERATION

[72] Inventors: Philippe C. Furois, Fishkill; Garland H. Latta, Hopewell Junction, both of N.Y.

[73] Assignee: International Business Machines Corporation, Armonk, N.Y.

[22] Filed: Aug. 5, 1970

[21] Appl. No.: 61,211

[52] U.S. Cl. ............................307/269, 307/274, 328/109

[51] Int. Cl. ..................................................H03k 17/00

[58] Field of Search ...........................328/63, 109, 129, 133; 307/206, 265, 286, 269

[56] References Cited

UNITED STATES PATENTS

| | | | |
|---|---|---|---|
| 3,453,550 | 7/1969 | Kuck | 328/109 |
| 3,229,116 | 1/1966 | McAlteer | 307/206 |

*Primary Examiner*—Donald D. Forrer

*Assistant Examiner*—B. P. Davis

*Attorney*—Hanifin and Jancin and Theodore E. Galanthay

[57] ABSTRACT

A time analog converter circuit for providing time stable circuit operation. The time analog converter is connected to an overall circuit between two points requiring a time stable relationship. By using a suitable fixed delay circuit, the time analog converter receives a signal from each of the two points at approximately the same time, the time analog converter determines the difference in the time of occurrence of the two signals and provides a corresponding correcting signal.

6 Claims, 11 Drawing Figures

INVENTORS
PHILIPPE C. FUROIS
GARLAND H. LATTA

BY Theodore E. Galanthay
ATTORNEY

TIME ANALOG CONVERTER CIRCUIT FOR JITTER-FREE OPERATION

CROSS-REFERENCE TO RELATED APPLICATIONS OR PATENTS

1. U.S. Pat. application, Ser. No. 663,710, filed Aug. 28, 1967, now U.S. Pat. No. 3,505,598, inventor: John F. Merrill, assigned to the assignee of the present application.

2. U.S. Pat. application, Ser. No. 848,802, filed Aug. 11, 1969, now U.S. Pat. No. 3,585,500, inventor: Stanley J. Grubel, assigned to the assignee of the present application.

These patents relate to circuits for measuring the high degree of stability as claimed by the present invention.

BACKGROUND OF THE INVENTION

1. Field of the Invention

This invention relates to a time analog converter circuit providing a voltage output indicative of the relative time of occurrence of two events. More specifically, this invention relates to a circuit for controlling the stability of operation of other circuits, thereby providing relatively jitter-free systems.

2. Description of the Prior Art

The stable operation of electronic circuits has been frequently addressed by the prior art. It is well known that the performance of circuits and systems depends greatly on the stable time relationship between an input stimulus (e.g., trigger pulse) and the output reaction. System functions regulated by clock distribution, pulse and word generators, oscilloscopes, etc., require the best available time stability between input and output, as well as jitter-free operation. Systems in which highly stable circuit operation is required, include but are not limited to testing circuits, radar, and telemetering.

In order to maintain highly stable circuit operation, it is necessary to have a means for sensing small time differences min the occurrence of two signals and quickly providing a correcting signal for eliminating that time difference. Prior art circuits for detecting very small time differences have proven inadequate for many high-speed circuit applications and have resulted in excessive "hunting." This resulted in a relatively inaccurate and unstable time relationship between the signals in the system. Such instabilities tend to limit the accuracy of systems such as radar and increase the jitter in apparatus such as oscilloscopes.

Another problem encountered in the prior art is that the operation of circuit components varies with temperature. To overcome this latter problem, it has been necessary to supply time-compensating circuits or components (such as thermistors) together with the remaining control circuitry in order to assure relatively stable operation over a range of temperatures.

SUMMARY OF THE INVENTION

It is, therefore, a general object of the present invention to stabilize the operation of high-speed circuits.

It is another object of this invention to control and maintain time stability between two events within a few picoseconds.

It is still another object of this invention to provide an analog voltage indicative of the difference in time of occurrence between two nearly simultaneous events.

A more specific object of this invention is to provide temperature compensation in a circuit for detecting small time differences between two events.

Lastly, it is a specific object of this invention to provide an automatic reset function in a circuit for determining small time differences in the occurrence of two events.

In order to accomplish these objects and in accordance with one aspect of this invention, there is provided a time analog converter (T.A.C.) circuit for analyzing the time relationship between two signals and for supplying a corresponding correcting voltage to a variable electronic delay. The T.A.C. circuit includes a highly sensitive tunnel diode discriminator for distinguishing between the time of occurrence of two events (e.g., electronic signal pulses). This tunnel diode is biased with a DC steady state current and requires the coincidence of both events (signals) in order to switch to its high state. In order to perform this function accurately, one of the signals to be discriminated is first converted to a very fast rise time pulse, (i.e., spike) by a strobe generator. The resultant output of the time level coincidence detector is eventually used to adjust a variable electronic delay.

In an overall system, where it is desired to have a precise time relationship between a signal at point A and a signal at point B, the time analog converter (T.A.C.) is positioned between points A and B in the circuit, in parallel with the signal path. The signal from point A is delayed by a fixed interval of time before it is applied to the T.A.C. in order to have it occur approximately coincidentally with the signal from point B in the circuit. The output of the T.A.C. then adjusts a variable electronic delay in the signal path between points A and B in order to establish the desired precise time relationship.

It is a feature of this invention that the T.A.C. circuit is temperature compensated. This compensation is obtained by the unique arrangement of the time level coincidence detector and strobe generator circuits. As the temperature increases, the tunnel diode discriminator in the time level coincidence detector tends to fire at a lower coincidence voltage, thereby indicating coincidence at an earlier instant of time. As a compensation for this earlier firing, however, the tunnel diode in the strobe generator supplies less energy in the form of a smaller spike. Less energy from the strobe generator requires a greater signal energy before the tunnel diode discriminator can fire, returning the coincident firing point towards the originally preset firing time. In this way, the two tunnel diodes tend to compensate for temperature differences without the use of additional time-compensating circuitry.

Another feature of this invention is a time analog converter circuit having automatic resetting means for the discriminator tunnel diode. This last feature is accomplished by providing a nonlinear load line to the tunnel diode, thereby providing automatic reset at the completion of each cycle.

BRIEF DESCRIPTION OF THE DRAWINGS

The foregoing and other objects, features and advantages of the invention will be apparent from the following more particular description of the present invention as illustrated in the accompanying drawings, wherein.

Figure 1:
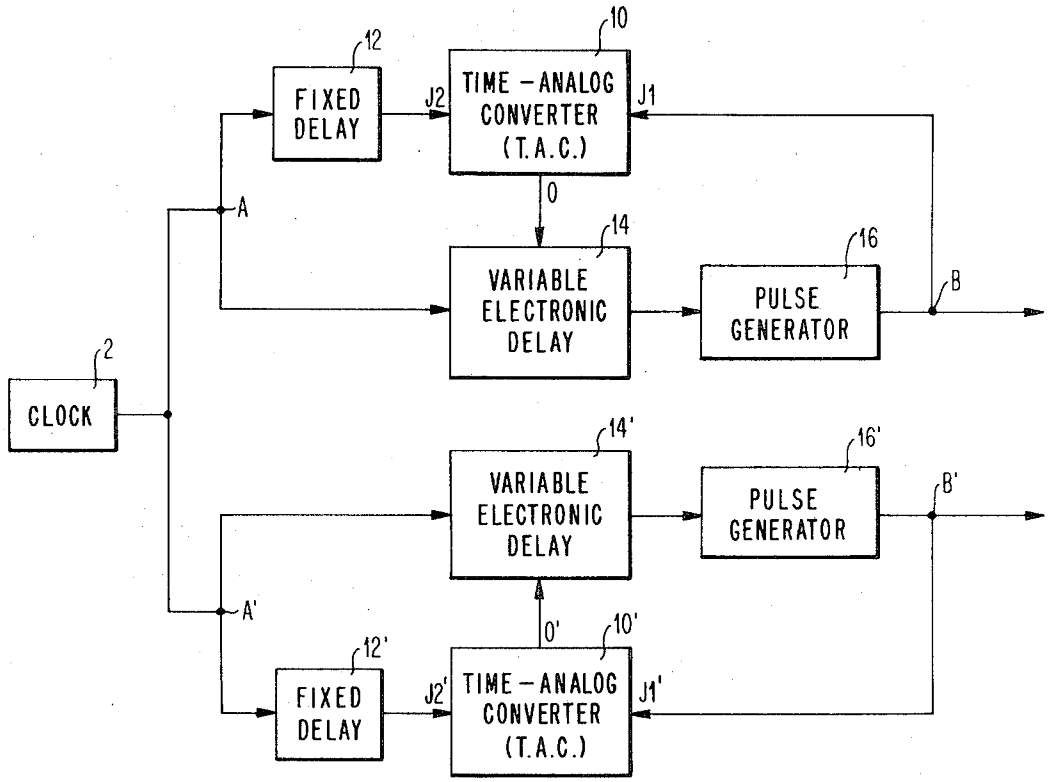
FIG. 1 is a logic diagram depicting a time stabilized circuit.
Figure 2:
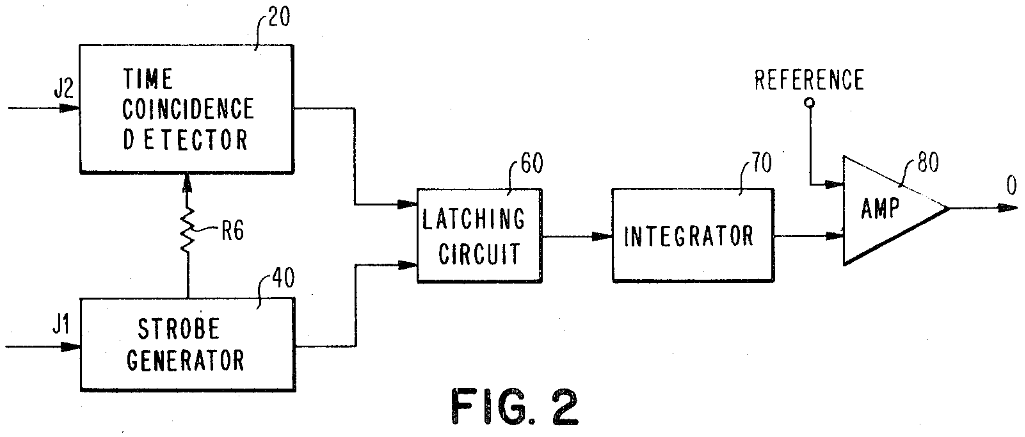
FIG. 2 is a logic diagram depicting the time analog converter (T.A.C.) circuit.

Refer now to FIG. 2, which is a detailed block diagram of the T.A.C. circuit 10. Input and output points have been marked as in FIG. 1. The T.A.C. circuit 10 consists of time coincidence detector 20, strobe generator 40, latching circuit 60, integrator 70, and operational amplifier 80. Strobe generator 40 has two outputs, one connected to latching circuit 60, the other coupled through coupling resistor R6 to time coincidence detector 20. Time coincidence detector 20 has an output in response to its two inputs connected to latching circuit 60. The output of latching circuit 60 is connected to integrator 70, the integrated signal being amplified by operational amplifier 80. Operational amplifier 80 has an additional reference input which is a DC offset voltage in order to have an output symmetrical about 0 volts. The amplification factor of amplifier 80 can be in the order of 120X.

Figure 3:
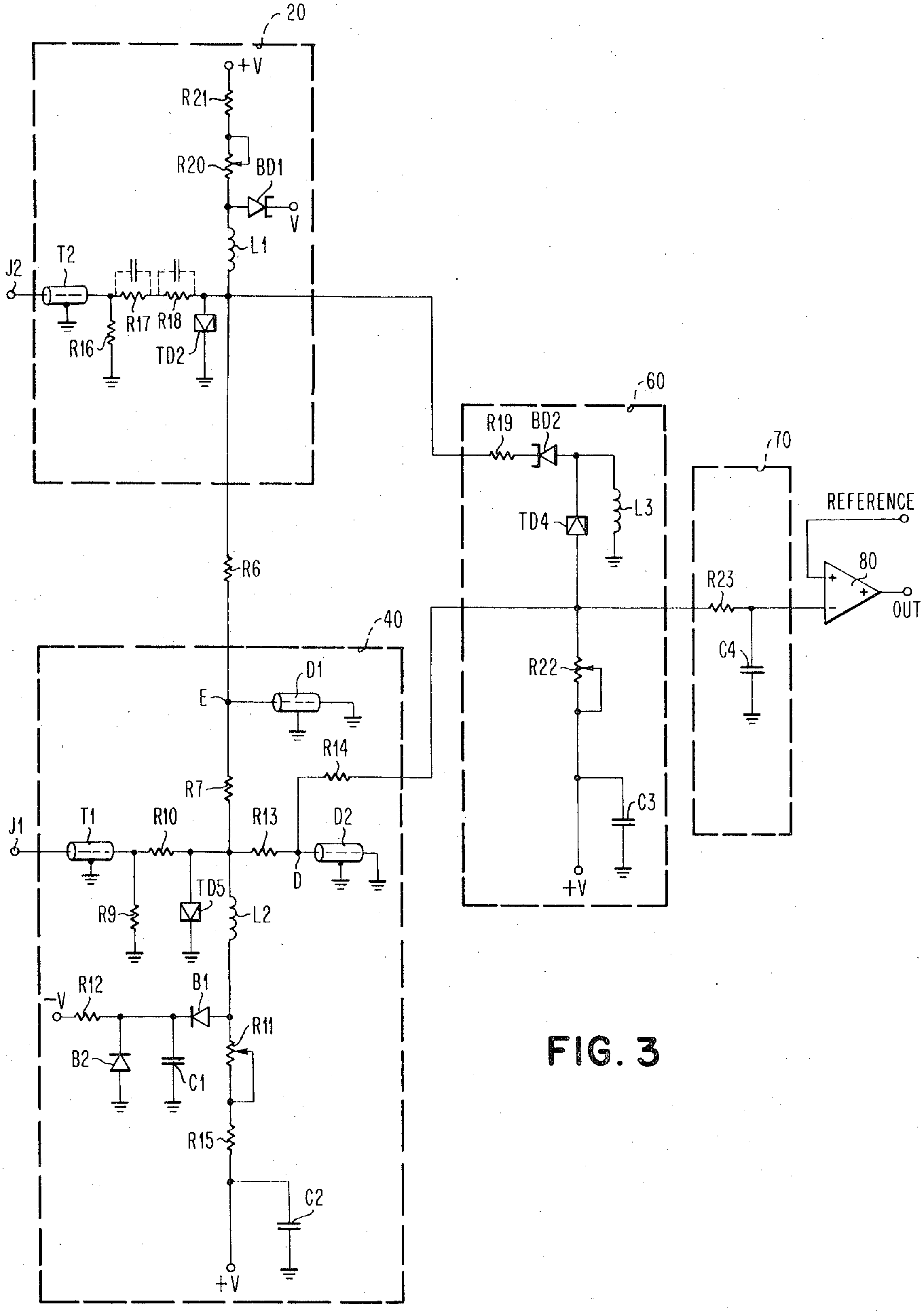
FIG. 3 is a detailed circuit diagram depicting the time analog converter (T.A.C.) circuit.

FIG. 3 shows an even more detailed circuit diagram of T.A.C. circuit 10. Dotted lines have been placed around the various circuit components indicating the correlation with the block diagram of FIG. 2. Strobe generator 40 receives its input from the transmission line at terminal J1. The amplitude of the signal is limited by current-limiting resistor R10 and terminating resistor R9. Resistor R10 is connected to tunnel diode TD5 which is returned to ground and also connected to resistors R7, R13, and inductor L2. Resistor R7 is further connected to transmission/delay line D1, the other end of which is connected to ground. Similarly, resistor R13 is further connected to transmission/delay line D2 which has its other end connected to ground. Resistors R7 and R13 are further connected to coupling resistors R6 and R14, respectively. Inductor L2 is further connected to variable resistor R11 and diode B1. Diode B1 is further connected to resistor R12, diode B2, and bypass (or decoupling) capacitor C1. The other end of diode B2 and bypass capacitor C1 are grounded while the other end of resistor R12 is connected to a negative potential. Variable resistor R11 is further connected to resistor R15, which in turn, is connected to bypass capacitor C2 and a positive source of potential. The other end of capacitor C2 is connected to ground.

The time coincidence detector receives the signal at terminal J2 on transmission line T2. Transmission line T2 is connected to transmission line terminating resistor R16 which is also connected to ground. Transmission line T2 is further connected to current-limiting resistor R17, which in turn, is connected to current-limiting resistor R18. The purpose of two resistors in series is to obtain desirable high frequency performance. At high frequencies, each resistor has some associated capacitance as indicated by the dotted line. By placing two resistors in series, the appropriate value of resistance can be obtained while reducing the capacitive effect, by causing the two capacitors to be in series. The same technique, of course, could be employed with resistor R10 in the strobe generator. Resistor R18 is further connected to tunnel diode TD2 which is also returned to ground. Resistor R18 is further connected to inductor L1, coupling resistor R6, and resistor R19. The other end of inductor L1 is further connected to back diode BD1 and variable resistor R20. The other end of BD1 is connected to a suitable source of potential V which may be ground. The other end of the variable resistor R20 is connected to resistor R21, which in turn, is connected to a positive bias source.

Latching circuit 60 includes resistor R19, connected to back diode BD2, which in turn, is connected to tunnel diode TD4 and inductor L3. L3 is grounded while TD4 is connected to a common point further connected to variable resistor R22, as well as resistor R23 in the succeeding stage and R14 in the previous stage. The other end of variable resistor R22 is connected to a positive potential and to the bypass capacitor C3 which is also grounded.

The integrator 70 in the simplest form includes the resistor R23 connected to the capacitor C4 in a well-known integrating arrangement. The point between the resistor R23 and capacitor C4 is the input to operational amplifier 80. In order to have the output O of operational amplifier 80 symmetrical about 0 volts, amplifier 80 receives a second input in the form of a DC offset voltage. This DC voltage is adjusted to a value approximately equal to the average output of integrating circuit 70.

Referring back to FIG. 1, the structure shown in addition to the time analog converter 10 includes clock 2, fixed delay 12, variable electronic delay 14, and pulse generator 16. Each of these can be of presently well-known and standard design and their internal structure forms no part of this invention. Clock 2 is any well known source of pulses. Fixed delay circuit 12 can be any known stable delay circuit. Pulse generator 16 can be any pulse generating circuit or any other type of utilization circuit or even a system connected between points A and B in the circuit as shown. Variable electronic delay circuit 14 has the characteristic that the signal passing from point A to pulse generator 16 is delayed by a variable amount depending on the amplitude and polarity of the voltage output O from T.A.C. 10. In its simplest form, this could be a step recovery diode circuit or a threshold firing circuit. A threshold firing circuit would provide an output from variable electronic delay 14 at different times depending on the threshold level set by output O from T.A.C. 10.

Output O from time analog converter 10 enters the variable electronic delay circuit through resistor 141. High frequency components of the signal are filtered out by inductor 142, prior to application to step recovery diode 143. The combination of the signal from T.A.C. 10 and the voltage-biasing signal consisting of potential source −V and resistor 144, bias step recovery diode 143. The variable electronic delay receives a second signal input from clock 2. This signal applied at A to terminating resistor 145 and through capacitor 146 is also applied to step recovery diode 143. Terminal A in this circuit corresponds to similarly marked point A in FIG. 1. The output to PG16 is provided through diode 147. The signal applied at point A is delayed as shown, depending on the bias potential received from T.A.C. 10.

OPERATION

Having described the structure of this invention, the operation will now be described. Referring to FIG. 1, clock 2, (or any other signal source) provides a signal to points A and A'. This signal can be referred to as the first event to which it is desired to precisely relate subsequent events. Of course, the circuit consisting of blocks 10, 12, 14 and 16 is all that is required to establish a precise and stable time relationship between points A and B. The circuitry connected between points A' and B' is shown as an example of additional circuits which could be similarly connected to clock 2. The signal at node A passes through variable electronic delay 14 to pulse generator 16. The pulse generator 16, as mentioned above, can be a pulse generator, per se, as indicated or any other utilization circuit having various delays therein, and providing an output to point B. Assuming for the moment that the variable electronic delay 14 has a delay set near 0 seconds, then the delay of the signal from point A to point B is primarily the delay of PG circuit 16 and the delays in the various transmission lines. The fixed delay of delay circuit 12 is then selected or adjusted to this amount so that two signals arrive substantially simultaneously at inputs J1 and J2 to T.A.C. circuit 10. T.A.C. circuit 10 then provides an analog voltage output at terminal O adjusting the amount of delay in variable electronic delay circuit 14. Good design would include setting the initial amount of delay in variable electronic delay circuit 14 to a finite amount so that its delay can be decreased as well as increased to correct for the anticipated variations in the circuit parameters. It is thus seen that an important function of TAC 10 is to analyze the time relationship between the two signals at J1 and J2 and supply a corresponding correcting voltage to the variable electronic delay 14. The variable electronic delay 14 will advance or slow down the pulse generator output signal whenever T.A.C. 10 detects noncoincidence at its inputs. Since the input signal is rigidly fixed in time upon its arrival at the T.A.C. 10, the output signal at point B will be held correspondingly fixed in time since the T.A.C. 10 continually adjusts variable electronic delay 14 in order to keep the signals at J1 and J2 coincident. The signal at point B, which is the second event, will always be in a precise fixed relationship in time to the signal at point A. Since the signals at points A and A' occur simultaneously, the signals at points B and B' will also occur simultaneously, so long as fixed delay circuits 12 and 12' have the identical delay and circuits 10 and 10' are built in accordance with the teachings of this application.

Refer now to FIG. 3 for a detailed description of the operation of T.A.C. circuit 10. First, the operation of strobe generator 40 will be described. In order to generate the strobe pulse, a threshold detecting element tunnel diode TD5 is utilized. A biasing network consisting of variable resistor R11, fixed resistor R15 and decoupling capacitor C2 in conjunction with a potential source +V provides a predetermined amount of current through tunnel diode TD5, biasing it to a desired level in its lower state. A signal entering through transmission line T1 and limited by current-limiting resistor R10 will fire tunnel diode TD5. The firing of TD5 causes a fast rise time pulse to travel through resistor R7 through transmission delay line D1 to ground as well as through resistor R13 down transmission delay line D2 to ground. Resistors R7 and R13 in combination with transmission delay line D1 and D2 form the spike impulse generating network. The spikes are generated at nodes D and E in response to the reflected signals from transmission delay D1 and D2.

Figure 4A:
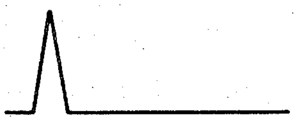
FIGS. 4A, 4B and 4C are waveform drawings illustrating the construction of the strobe generator.
Figure 4B:
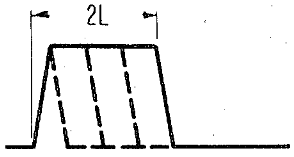
Figure 4C:
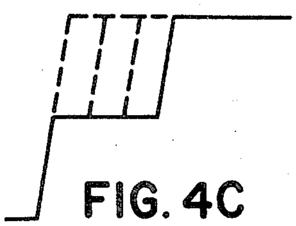

The manner of adjusting the transmission/delay lines D1 and D2 in order to obtain the desired length, and generate the desired pulse, is better illustrated in FIG. 4. FIG. 4A shows the desired pulse at nodes D and E. If D1 or D2 are too long, a pulse shown by solid lines in FIG. 4B will result. A signal arriving at nodes D ro E travels down the length of the delay line and is reflected back by the short-circuiting connection to ground. Therefore, at 2L, an interval of time equivalent to twice the length of the transmission line, the reflected pulse will cause the signal at nodes D and E to return to the down level. Therefore, as the delay lines are made shorter and shorter, the waveforms indicated in dotted lines in FIG. 4B result, until the final desired shape is reached. It is difficult to make a transmission/delay line of exact length with the waveform of FIG. 4B. Therefore, during construction of the delay line, the normally grounded end is open circuited. This results in a waveform of the type shown in solid lines in FIG. 4C. As the transmission line is shortened, the waveforms shown in dotted lines result until there is a straight line slope from the down level to a value which is two times the normal up level because of the reflection from the open ended delay line. The grounding of the delay line at that end will then result in the waveform of FIG. 4A.

The strobe generator 40 is thus a pulse forming network generating a spike-shaped signal impulse in response to a signal input. Tunnel diode TD5 is fired from its low state to its high stage by the signal coming in on transmission line T1, based on the previously set DC bias. The bias circuitry includes fixed resistor R15 and variable resistor R11 connected in series to a source of positive potential. Bypass capacitor C2 is used to eliminate fluctuations in the bias potential. When the tunnel diode is fired into its high state, a fast rise time pulse travels through resistors R7 and R13 to points D and E, and spikes are formed at these points due to the reflected signals from transmission delay lins D1 and D2. Resistor R10 limits the incoming signal and the incoming current passes through tunnel diode TD5. Accordingly, only signals resulting from the switching of TD5 to its high state are introduced to transmission delay lines D1 and D2. These spikes pass through coupling resistors R6 and R14 to time coincidence detector 20 and latching circuit 60, respectively. After the spike has been generated, tunnel diode TD5 is automatically reset to its low state by the reset circuit, including inductor L2, diodes B1 and B2, capacitor C1 and resistor R12.

Figure 5:
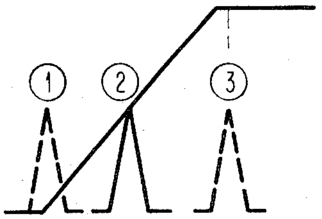
FIG. 5 is a waveform drawing showing coincidence between the signal and strobe.

In order to detect the relative time of occurrence at terminals J1 and J2 of time analog converter 10, time coincidence detector 20 is provided. Tunnel diode TD2 must receive three coincident signals in order to fire from its low to its high state. The first of these signals is a DC biased potential provided by positive potential source +V and series fixed resistor R21 and variable resistor R20. This current path provides a steady state current through tunnel diode TD2 and determines the level of the input signal from terminal J2 at which the strobe signal from strobe generator 40 will fire tunnel diode TD2. Refer to FIG. 5 for the three possible conditions applied to tunnel diode TD2. It is, of course, understood that the DC biasing current is always present at a desired level once variable resistor R20 has been adjusted. The signal enters through transmission line T2 which is terminated to ground by resistor R16 and passes through current-limiting resistors R17 and R18. If this signal arrives at tunnel diode TD2 after the strobe impulse has passed, as indicated in condition 1 of FIG. 5, tunnel diode 2 will not be fired into its higher state. If the signal and the impulse or spike from the strobe generator arrive at tunnel diode TD2 concurrently, TD2 will be fired into its higher state. This is demonstrated at condition 2 of FIG. 5. At condition 3 of FIG. 5, where the strobe arrives after the signal has reached full amplitude, tunnel diode TD2 will again fire into its high state. The signal from tunnel diode TD2 is conducted to latching circuit 60 as is the output of the strobe generator 40.

Figures 7, 8:
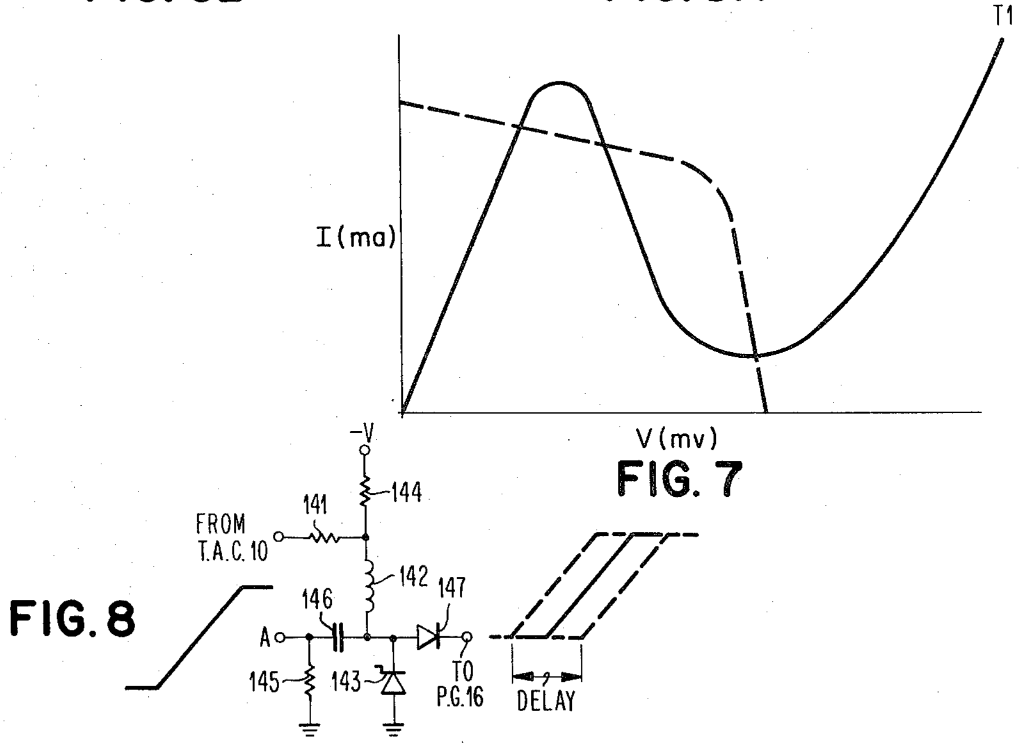
FIG. 7 is a waveform showing the automatic reset feature.
FIG. 8 is a detailed circuit diagram depicting a variable electronic delay circuit. cl DESCRIPTION OF THE PREFERRED EMBODIMENT Refer now to FIG. 1 which shows an arrangement for a time stable system. Source of signals as clock 2 and circuits such as pulse generators 16 and 16′ are standard circuits. In that type of standard circuit, there is neither a precise time relationship between points A and B, nor A′ and B′. Moreover, there is no assurance that if A and A′ occur simultaneously that B and B′ would also occur simultaneously. The time stable system of this invention, therefore, additionally includes time analog converter (T.A.C.) circuits 10 and 10′, fixed delay circuits 12 and 12′ and variable electronic delay circuits 14 and 14′. The variable electronic delay circuits 14 and 14′ and pulse generators 16 and 16′, all connected between clock 2 and the output nodes B and B′. In parallel with this signal path, there are connected the fixed delay circuits 12 and 12′ and the T.A.C. circuit 10 and 10' in series. The fixed delay circuit 12 has a delay approximately equal to the sum of the delays through the variable electronic delay and pulse generator circuits. For this reason, inputs J1 and J2 to T.A.C. circuit 10 are in approximate time coincidence. The output 0 of T.A.C. circuits 10 and 10', are connected to variable electronic delay circuits 14 and 10', respectively. The time stabilized outputs are available at node B and B'.

Before describing the effects of these two inputs on latching circuit 60, the operation of the reset circuit in time coincidence detector 20 is briefly described. This reset circuit consists of back diode BD1 and inductor L1. Of course, it would be possible to have a reset pulse provided directly to tunnel diode TD2. The need for a reset pulse of that type, however, is avoided since back diode BD1 provides a load line as shown in FIG. 7. By providing an appropriate biasing voltage at terminal V, of a value slightly less than the lowest point of the dip in the characteristic curve of tunnel diode TD2, the tunnel diode TD2 is unable to stay in its high-voltage state for a time longer than provided by the energy stored in inductor L1. As shown in FIG. 7, after a period of time dependent on the value L1, the tunnel diode will reset to its low state.

Refer to FIG. 3 again, for a description of the operation of latching circuit 60. For purposes of example, consider first condition one in FIG. 5 in which tunnel diode TD2 has remained in its low state so that latching circuit 60 receives a spike input only from pulse generator 40. This spike added to the biasing current applied by the combination of potential source +V, variable resistor R22 and decoupling capacitor C3, fires tunnel diode TD4 into its high state, providing a positive step output to integrating circuit 70. In the alternative, considering conditions 2 and 3 from FIG. 5, a spike is received by latching circuit 60 also from time coincidence detector 20. This spike from time coincidence detector 20 passes through current-limiting resistor R19 and back diode BD2. Tunnel diode TD4, therefore, has two spikes simultaneously applied to its anode and cathode and, therefore will not fire into its high state. Since tunnel diode TD4 does not fire in this condition, no impulse is conducted to integrating circuit 70. Back diode BD2 prevents the voltage which is developed by the switching of TD4 to affect the bias condition of TD2.

The operation of integrating circuit 70 is conventional and straight forward. The need for integrating circuit 70 arises from the fact that the electronic delay 14 receiving the output of amplifier 80 might not be in the same phase as its input signal, therefore, preventing correction and generating "hunting." For this reason, integrating circuit 70 helps to smooth out the output of latching circuit 60. When tunnel diode TD4 is not fired, a lower output is received by integrator 70 than when TD4 fires into its high state. Amplifier 80 receives the output of integrator 70 and also receives a reference offset voltage so that the output of amplifier 80 will fluctuate about 0 volts. When tunnel diode TD4 is not reset, and remains in its high state over a relatively long interval, the output of amplifier 80 will approach its saturation potential of approximately −10 volts. (Amplifier 80 has an inverted output.) Similarly, if tunnel diode TD4 remains in its low state over a relatively long period of time, the output of amplifier 80 will approach +10 volts. In a normal situation, however, where the number of cycles in which tunnel diode TD4 fires is approximately equal to the number of times it does not fire, the output of amplifier 80 will remain near 0 volts. If the signal input at terminal J2 is somewhat leading the strobe generator output, as shown in condition 1 if FIG. 5 then the amplifier output will tend to be in the negative voltage range causing a grater delay in variable electronic delay 14. Conversely, if the signal is lagging the strobe pulse, as shown in condition 3 in FIG. 5, then tunnel diode TD2 will fire, TD4 will not fire, a low-level output will be provided to amplifier 80 and its output will tend to be positive. This will cause the variable electronic delay 14 to have a grater delay, permitting the signals at terminals J1 and J2 to come into synchronism.

Figure 6A:
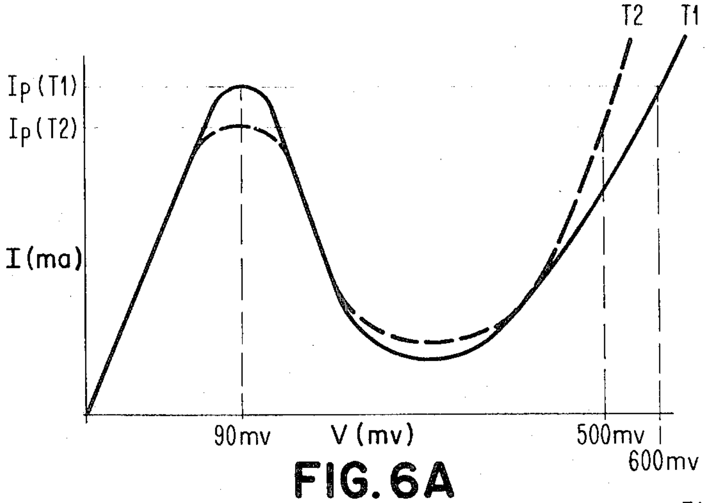
FIGS. 6A and 6B show the operation of the tunnel diode discriminator and the automatic temperature compensation.
Figure 6B:
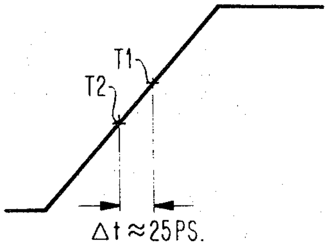

Refer now to FIGS. 6A and 6B for a description of the operation of the automatic temperature compensation embodied in the circuit. FIG. 6A is a current voltage plot of any one of the tunnel diodes used in this circuit. Waveform 1 indicates the characteristic curve at a first temperature T1 (i.e., room temperature of 25° C.) while curve T2 illustrates the waveform at a second and higher temperature T2. Assume the various values noted on the curve for purposes of this example. It is noted that at the higher temperature, the tunnel diodes will tend to fire into their high states at a lower current. At this higher temperature condition, tunnel diode TD5 in strobe generator 40 will provide a strobe impulse at a slightly earlier instant of time. As indicated in FIG. 6B, the firing time at the higher temperature T2 might be 25 picoseconds earlier than the firing time at temperature T1. The voltage swing of the strobe impulse, however, decreases to 410 millivolts at the T2 temperature, as opposed to 510 millivolts at the T1 temperature. This results in a lesser amount of energy being conducted to tunnel diode TD2. Tunnel diode TD2 will, therefore, require a higher energy from the signal input from terminal J1 before it will fire. This will tend to move the time of firing back to the T1 level. Of course, since tunnel diode TD2 will also be at the higher temperature and therefore able to fire at a lower current level, the temperature compensation might not be in a 1-to-1 ratio. Nevertheless, the two just described factors tend to move the operating points in opposite directions, thereby tending to minimize the effect of temperature variation. Temperature compensation is partially achieved by the fact that all of the higher temperature tunnel diodes will now fire at an earlier time resulting in the same time coincidence as achieved at the lower temperature.

The following table of exemplary component values is provided:

| | | |
|---|---|---|
| R6 | 32 | 100 ohms |
| R7 | = | 51 ohms |
| R( | = | 51 ohms |
| R10 | = | 1.5 K |
| R11 (variable resistor) | = | approximately 1 K |
| R12 | = | 1.5 K |
| R13 | = | 51 ohms |
| R14 | =m | 51 phms |
| R15 | m = | 200 ohms |
| R16 | = | 56 ohms |
| R17 | = | 390 ohms |
| R18 | = | 110 ohms |
| R19 | | 51 ohms |
| R20 (variable resistor) | = | approximately 1K |
| R21 | = | 1 K |
| R22 (variable resistor) | = | approximately t K |
| R23 | 32 | 1 K |
| capacitor C1 | = | 0.1 microfarad |
| capacitor C2 | = | 0.1 microfarad |
| capacitor C3 | = | 0.1 microfarad |
| capacitor C4 | = | 1 microfarad |
| inductor L1 | = | 1 microhenry |
| inductor L2 | = | .33 microhenries |
| inductor L3 | = | .33 microhenries |
| +V potential sources | = | +15 volts |
| −V potential sources | = | −15 volts |
| V terminal is set at ground | | |
| Offset reference voltage input to amplifier 80 | = | L370 mv. |
| Amplification factor of amplifier | = | approximately 120 |

In conclusion, there has been described a stabilizing circuit for providing jitter-free operation. The circuit is repetition rate independent, no fast rise time input pulses are required and there is no continuous hunting as in circuits previously known in the art. In this way, a second event is maintained in a precise time relationship to a first event.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. In a jitter-free system for causing the occurrence of a second event to take place in a precise time relationship to the occurrence of a first event, means for detecting minor differences in the time of occurrence of said first event and said second event and for providing a correcting signal for causing said two events to occur in synchronism, said means comprising:

generating means for providing an impulse output in response to an input indicative of the first event;

coincident-detecting means for detecting the time relationship between the peak of said impulse output of said generating means and a signal indicative of the second event and providing an output indicative of said time relationship;

circuit means for accepting the output of said generating means and said coincidence detecting means, providing an output in response to said two inputs, said output being a correcting signal for continually bringing said second event into a precise time relationship with said first event.

2. A time analog converter comprising:

generating means for generating a fast impulse spike in response to a first signal input, said first signal input being indicative of a first event;

said generating mans comprising a tunnel diode fired from its low state to its high stage by an input signal at least one node electrically coupled to said tunnel diode, and a short-circuited transmission line connected to said at least one node for providing a reflected signal, the delay in said transmission line being adjusted such that the signal at said at least one node becomes a waveform in the shape of a fast impulse spike having a width in the order of 200 picoseconds at its base;

coincidence circuit means responsive to the output of said generating means and to a signal indicative of a second event for providing an output indicative of the time relationship of said two inputs; and circuit means responsive to the output of said generating means and said coincidence-detecting means for providing a correcting signal, thereby bringing the said two events into a precise time relationship with each other.

3. A circuit as in claim 2 having automatic means for resetting said tunnel diode to its low state.

4. A system as in claim 2 in which the coincidence circuit means comprises:

a tunnel diode for detecting coincidence of: a steady state biasing current, a signal pulse, and a strobe impulse; and automatic resetting means for resetting said tunnel diode to its low state.

5. A time analog converter comprising:

generating means for generating a fast impulse spike in response to a first signal input, said first signal input being indicative of a first event;

coincidence circuit means responsive to the output of said generating means and to a signal indicative of a second event for providing an output indicative of the time relationship of said two inputs; and circuit means responsive to the output of said generating means and said coincidence-detecting means for providing a correcting signal, thereby bringing the said two events into a precise time relationship with each other;

said circuit means comprising a tunnel diode switchable from its low state to its high state in response to the presence of a fast impulse spike occurring in the absence of a signal impulse from said time coincidence means.

6. A time analog converter comprising:

generating means for generating a fast impulse spike in response to a first signal input, said first signal input being indicative of a first event;

coincidence circuit means responsive to the output of said generating means and to a signal indicative of a second event for providing an output indicative of the time relationship of said two inputs; and circuit means responsive to the output of said generating means and said coincidence-detecting means for providing a correcting signal, thereby bringing the said two events into a precise time relationship with each other;

said generating means and coincidence circuit means each comprising a tunnel diode, the output of said coincidence circuit means remaining substantially fixed in time so long as the temperature variation of the said two tunnel diodes remains substantially similar, thereby providing automatic temperature compensation.

* * * * *

PO-1050
(5/69)

UNITED STATES PATENT OFFICE
CERTIFICATE OF CORRECTION

Patent No. 3,644,756 Dated February 22, 1972

Inventor(s) Philippe C. Furois and Garland H. Latta

It is certified that error appears in the above-identified patent and that said Letters Patent are hereby corrected as shown below:

| | |
|---|---|
| Column 7, First Line of the Table | change "32" to -- = -- |
| Column 7, Third Line of the Table | change "R(" to -- R9 -- |
| Column 7, 9th Line of the Table | change "=m" to -- = -- |
| Column 7, 10th Line of the Table | change "m=" to -- = -- |
| Column 7, 18th Line of the Table | change "t K" to -- 5K -- |
| Column 7, 20th Line of the Table | change "32" to -- = -- |
| Column 8, 14th Line of the Table | change "L370" to -- 370 -- |
| Column 8, Line 37 | change "coincident-detecting" to -- coincidence detecting -- |
| Column 8, Line 51 | change "mans" to -- means -- |
| Column 8, Line 52 | change "stage" to -- state -- and after "signal" insert -- , -- |

Signed and sealed this 6th day of February 1973.

(SEAL)
Attest:

EDWARD M.FLETCHER,JR.
Attesting Officer

ROBERT GOTTSCHALK
Commissioner of Patents